(12) United States Patent
Saavedra

(10) Patent No.: US 7,747,953 B2
(45) Date of Patent: Jun. 29, 2010

(54) METHODS AND SYSTEMS FOR RECEIVING FEEDBACK FROM A SCALABLE NUMBER OF PARTICIPANTS OF AN ON-LINE PRESENTATION

(75) Inventor: Rafael H. Saavedra, Santa Barbara, MA (US)

(73) Assignee: Citrix Online, LLC, Santa Barbara, CA (US)

( * ) Notice: Subject to any disclaimer, the term of this patent is extended or adjusted under 35 U.S.C. 154(b) by 496 days.

(21) Appl. No.: 11/424,396

(22) Filed: Jun. 15, 2006

(65) Prior Publication Data

US 2007/0294623 A1   Dec. 20, 2007

(51) Int. Cl.
*G06F 3/00* (2006.01)
(52) U.S. Cl. ..................... 715/730; 709/204
(58) Field of Classification Search ............. 715/753, 715/730, 751, 755, 759; 709/204
See application file for complete search history.

(56) References Cited

U.S. PATENT DOCUMENTS

| | | | |
|---|---|---|---|
| 4,974,173 A | 11/1990 | Stefik et al. | |
| 5,255,361 A | 10/1993 | Callaway et al. | |
| 5,367,633 A | 11/1994 | Matheny et al. | |
| 5,619,638 A | 4/1997 | Duggan et al. | |
| 5,696,948 A | 12/1997 | Cruz et al. | |
| 5,726,669 A * | 3/1998 | Obata et al. | 345/2.2 |
| 5,758,110 A | 5/1998 | Boss et al. | |
| 5,768,614 A | 6/1998 | Takagi et al. | |
| 5,793,973 A | 8/1998 | Birdwell et al. | |
| 5,812,780 A | 9/1998 | Chen et al. | |
| 5,874,960 A | 2/1999 | Mairs et al. | |
| 5,913,920 A * | 6/1999 | Adams et al. | 709/204 |
| 6,002,394 A | 12/1999 | Schein et al. | |
| 6,108,662 A | 8/2000 | Hoskins et al. | |
| 6,118,521 A | 9/2000 | Jung et al. | |
| 6,155,840 A | 12/2000 | Sallette | |
| 6,157,864 A | 12/2000 | Schwenke et al. | |
| 6,161,051 A | 12/2000 | Hafemann et al. | |
| 6,167,406 A | 12/2000 | Hoskins et al. | |

(Continued)

FOREIGN PATENT DOCUMENTS

EP    0576183    12/1993

(Continued)

OTHER PUBLICATIONS

User Guide—Global Crossing Live Meeting Powered by Microsoft, 2005, Global Crossing, pp. 1-55.*

(Continued)

*Primary Examiner*—Boris Pesin
*Assistant Examiner*—Shen Shiau
(74) *Attorney, Agent, or Firm*—Goodwin Procter LLP

(57) ABSTRACT

Methods and systems for receiving feedback from a scalable number of participants of an on-line presentation. One method includes analyzing a screen change data set at a first computing device of an on-line presentation environment, tagging the screen change data set as requesting acknowledgement by the one or more viewers, and transmitting the screen change data set to the one or more viewers. The method also includes receiving a confirmation of receipt of the tagged screen change data set, generating a representation of the tagged screen change data set in response to receiving the confirmation of receipt, and displaying the generated representation at a presenter.

24 Claims, 11 Drawing Sheets

U.S. PATENT DOCUMENTS

| | | | |
|---|---|---|---|
| 6,246,471 B1 | 6/2001 | Jung et al. | |
| 6,246,479 B1 | 6/2001 | Jung et al. | |
| 6,249,348 B1 | 6/2001 | Jung et al. | |
| 6,250,548 B1 | 6/2001 | McClure et al. | |
| 6,256,773 B1 | 7/2001 | Bowman-Amuah | |
| 6,263,501 B1 | 7/2001 | Schein et al. | |
| 6,268,853 B1 | 7/2001 | Hoskins et al. | |
| 6,295,513 B1 | 9/2001 | Thackston | |
| 6,324,647 B1 | 11/2001 | Bowman-Amuah | |
| 6,329,984 B1 | 12/2001 | Boss et al. | |
| 6,362,888 B1 | 3/2002 | Jung et al. | |
| 6,370,573 B1 | 4/2002 | Bowman-Amuah | |
| 6,373,573 B1 | 4/2002 | Jung et al. | |
| 6,388,714 B1 | 5/2002 | Schein et al. | |
| 6,397,036 B1 | 5/2002 | Thean et al. | |
| 6,405,364 B1 | 6/2002 | Bowman-Amuah | |
| 6,414,750 B2 | 7/2002 | Jung et al. | |
| 6,473,794 B1 | 10/2002 | Guheen et al. | |
| 6,519,037 B2 | 2/2003 | Jung et al. | |
| 6,519,571 B1 | 2/2003 | Guheen et al. | |
| 6,523,027 B1 | 2/2003 | Underwood | |
| 6,536,037 B1 | 3/2003 | Guheen et al. | |
| 6,539,429 B2 | 3/2003 | Rakavy et al. | |
| 6,556,950 B1 | 4/2003 | Schwenke et al. | |
| 6,567,813 B1 | 5/2003 | Zhu et al. | |
| 6,581,824 B1 | 6/2003 | McClure et al. | |
| 6,583,866 B2 | 6/2003 | Jung et al. | |
| 6,590,660 B2 | 7/2003 | Jung et al. | |
| 6,601,233 B1 | 7/2003 | Underwood | |
| 6,609,128 B1 | 8/2003 | Underwood | |
| 6,615,166 B1 | 9/2003 | Guheen et al. | |
| 6,629,081 B1 | 9/2003 | Cornelius et al. | |
| 6,633,878 B1 | 10/2003 | Underwood | |
| 6,636,585 B2 | 10/2003 | Salzberg et al. | |
| 6,641,033 B2 | 11/2003 | McClure et al. | |
| 6,643,696 B2 | 11/2003 | Davis et al. | |
| 6,658,464 B2 | 12/2003 | Reisman | |
| 6,662,357 B1 | 12/2003 | Bowman-Amuah | |
| 6,662,998 B2 | 12/2003 | McClure et al. | |
| 6,669,485 B2 | 12/2003 | Thean et al. | |
| 6,678,355 B2 | 1/2004 | Eringis et al. | |
| 6,688,517 B1 | 2/2004 | McClure et al. | |
| 6,701,345 B1 | 3/2004 | Carley et al. | |
| 6,704,873 B1 | 3/2004 | Underwood | |
| 6,718,535 B1 | 4/2004 | Underwood | |
| 6,721,713 B1 | 4/2004 | Guheen et al. | |
| 6,728,753 B1 * | 4/2004 | Parasnis et al. | 709/203 |
| 6,732,369 B1 | 5/2004 | Schein et al. | |
| 6,745,170 B2 | 6/2004 | Bertrand et al. | |
| RE38,609 E | 10/2004 | Chen et al. | |
| 6,862,553 B2 | 3/2005 | Schwenke et al. | |
| 6,870,616 B2 | 3/2005 | Jung et al. | |
| 6,885,920 B2 | 4/2005 | Yakes et al. | |
| 6,915,955 B2 | 7/2005 | Jung et al. | |
| 6,920,502 B2 | 7/2005 | Araujo et al. | |
| 6,928,396 B2 | 8/2005 | Thackston | |
| 6,934,578 B2 | 8/2005 | Ramseth | |
| 6,947,914 B2 | 9/2005 | Bertrand et al. | |
| 6,957,186 B1 | 10/2005 | Guheen et al. | |
| 6,970,858 B1 | 11/2005 | Nichols | |
| 6,980,962 B1 | 12/2005 | Arganbright et al. | |
| 6,993,421 B2 | 1/2006 | Pillar et al. | |
| 6,993,456 B2 | 1/2006 | Brooks et al. | |
| 7,035,907 B1 | 4/2006 | Decasper et al. | |
| 7,054,848 B1 | 5/2006 | Lannert et al. | |
| 7,065,512 B1 | 6/2006 | Bertrand et al. | |
| 7,065,513 B1 | 6/2006 | Bertrand et al. | |
| 7,069,186 B2 | 6/2006 | Jung et al. | |
| 7,069,234 B1 | 6/2006 | Cornelius et al. | |
| 7,089,222 B1 | 8/2006 | Lannert et al. | |
| 7,092,821 B2 * | 8/2006 | Mizrahi et al. | 702/1 |
| 7,100,195 B1 | 8/2006 | Underwood | |
| 7,117,189 B1 | 10/2006 | Nichols et al. | |
| 7,139,999 B2 | 11/2006 | Bowman-Amuah | |
| 7,149,698 B2 | 12/2006 | Guheen et al. | |
| 7,156,665 B1 | 1/2007 | O'Connor et al. | |
| 7,165,041 B1 | 1/2007 | Guheen et al. | |
| 7,167,182 B2 * | 1/2007 | Butler | 345/537 |
| 7,167,844 B1 | 1/2007 | Leong et al. | |
| 7,171,174 B2 | 1/2007 | Ellis et al. | |
| 7,181,419 B1 | 2/2007 | Mesaros | |
| 7,184,866 B2 | 2/2007 | Squires et al. | |
| 7,194,444 B1 | 3/2007 | Nichols | |
| 2001/0047406 A1 | 11/2001 | Araujo et al. | |
| 2002/0029285 A1 | 3/2002 | Collins | |
| 2002/0032725 A1 | 3/2002 | Araujo et al. | |
| 2003/0140121 A1 | 7/2003 | Adams | |
| 2003/0227479 A1 * | 12/2003 | Mizrahi et al. | 345/753 |
| 2004/0031058 A1 | 2/2004 | Reisman | |
| 2004/0073512 A1 | 4/2004 | Maung | |
| 2004/0191748 A1 | 9/2004 | Thean et al. | |
| 2004/0199575 A1 | 10/2004 | Geller | |
| 2006/0080614 A1 * | 4/2006 | Lentz | 715/753 |
| 2007/0245248 A1 | 10/2007 | Christiansen | |

FOREIGN PATENT DOCUMENTS

| | | |
|---|---|---|
| EP | 1087618 | 3/2001 |
| WO | WO 2004/072804 | 8/2004 |

OTHER PUBLICATIONS

Hung et al., An Efficient Approach to Holding a Virtual Conference, 2001, Proc. Natl. Scie Counc ROC(A), vol. 25, No. 6, pp. 352-366.*

International Search Report for corresponding PCT Application No. PCT/US2007/013989, mailed Apr. 3, 2008, 4 pages.

Written Opinion for corresponding PCT Application No. PCT/US2007/013989, mailed Apr. 3, 2008, 5 pages.

International Search Report for International Application No. PCT/US2007/009019, mailed Oct. 2, 2007, 3 pages.

Written Opinion for International Application No. PCT/US2007/009019, mailed Oct. 2, 2007, 6 pages.

Egevang et al., "The IP Network Address Translator (NAT)," [online]. Request for Comments: 1631, May 1994, [retrieved Oct. 29, 2009]. Retrieved from the Internet: <http://www.safety.net/rfc1631.txt>, 9 pages.

* cited by examiner ical devices collect feedback information about the delivery of screen sharing updates from a presenter to viewers. As the number of viewers increases, so does the amount of feedback information that is received in the form of acknowledgements from all participants. The more attendees present in the on-line presentation coupled with the number of screen updates can give rise to an overwhelming amount of data is send back to the presenter. As a result, the bandwidth consumption increases as a function of the number of attendees times the number of screen updates.
METHODS AND SYSTEMS FOR RECEIVING FEEDBACK FROM A SCALABLE NUMBER OF PARTICIPANTS OF AN ON-LINE PRESENTATION

FIELD OF THE INVENTION

The present invention relates generally to on-line presentations. More specifically, the invention relates to providing visual feedback to the presenter of an on-line presentation.

BACKGROUND OF THE INVENTION

In some on-line presentation environments (e.g., an on-line meeting or webinar), one or more computing devices collect feedback information about the delivery of screen sharing updates from a presenter to viewers. As the number of viewers increases, so does the amount of feedback information that is received in the form of acknowledgements from all participants. The more attendees present in the on-line presentation coupled with the number of screen updates can give rise to an overwhelming amount of data is send back to the presenter. As a result, the bandwidth consumption increases as a function of the number of attendees times the number of screen updates.

SUMMARY OF THE INVENTION

At least two mechanisms can be employed to scale the number acknowledgement receipts received from the viewers of the on-line presentation. One mechanism includes restricting the number of attendees that send screen sharing feedback information. Another mechanism includes identifying (e.g., tagging) a select number of screen updates (i.e., epochs) that have to be acknowledged. Both mechanism can be static or dynamic and centralized or distributed.

For example, a static centralized selection of participants can feature a presenter that selects those participants that will send back acknowledgements to the presenter. The presenter sends messages identifying the set of participants requested to send feedback information. An example of a static distributed selection of participants includes allowing the participants themselves based on local information (e.g., the participant id, name, and the like) to determine whether send feedback to the presenter. An exemplary dynamic centralized scalable process includes tagging screen change data sets greater than a certain predetermined size as requiring an acknowledgement.

In one aspect, the invention features a method that operates in an on-line presentation environment having a presenter transmitting screen data to one or more viewers. The method provides to the presenter visual feedback by scaling the number of confirmation receipts of screen change data from the one or more viewers. The method includes analyzing a screen change data set at a first computing device of the on-line presentation environment, tagging the screen change data set as requesting acknowledgement by the one or more viewers, and transmitting the screen change data set to the one or more viewers. The method also includes receiving a confirmation of receipt of the tagged screen change data set from at least one of the one or more viewers, generating a representation of the tagged screen change data set received by the one or more viewers in response to receiving the confirmation of receipt, and displaying the generated representation at the presenter.

In various embodiment, the analysis occurs at a communication server of the on-line presentation environment, a viewer of the on-line presentation environment, or a presenter of the on-line presentation environment. In another embodiment, the method includes determining one or more of the one or more viewers to confirm receipt of the tagged screen change data set.

In further embodiments, the determining includes selecting, by the presenter, one or more of the one or more viewers having an associated bandwidth that exceeds a predetermined level. The determining can also include comparing, by each of the one or more viewers, an associated bandwidth with a predetermined bandwidth and receiving a receipt of confirmation from the one or more of the one or more viewers that equal or exceed the predetermined bandwidth. Another means for determining includes selecting by an end-user of the presenter which of the one or more viewers to receive a confirmation of receipt of the tagged screen change data set.

The determining can be performed at periodic intervals or in response to a specific event. The determining can also include randomly selecting one or more of the one or more viewers to confirm receipt of the tagged screen change data set.

In another aspect, the invention features a computing device that provides a presenter of an on line presentation environment visual feedback regarding the status of one or more viewers by scaling the number of confirmation receipts of screen change data by the one or more viewers. The computing device includes a processor for executing computer readable instructions and a memory element that stores computer readable instructions. When the instructions are executed by the processor cause the computing device to analyze a screen change data set, tag the screen change data set as requesting acknowledgement by the one or more viewers, and transmit the screen change data set to the one or more viewers. The execution of instructions also cause the computing device to receive a confirmation of receipt of the tagged screen change data set from at least one of the one or more viewers, generate a representation of the tagged screen change data set received by the one or more viewers in response to receiving the confirmation of receipt, and display the generated representation at the presenter.

In another aspect, the invention features a computer readable medium having executable instructions thereon to provide a presenter of an on line presentation environment visual feedback regarding the status of one or more viewers by scaling the number of confirmation receipts of screen change data by the one or more viewers. The computer readable medium includes instructions to analyze a screen change data set at a first computing device of the on-line presentation environment, tag the screen change data set as requesting acknowledgement by the one or more viewers, and transmit the screen change data set to the one or more viewers. The medium also includes instructions to receive a confirmation of receipt of the tagged screen change data set from at least one of the one or more viewers, generate a representation of the tagged screen change data set received by the one or more viewers in response to receiving the confirmation of receipt, and display the generated representation at the presenter.

BRIEF DESCRIPTION OF THE DRAWINGS

The foregoing discussion will be understood more readily from the following detailed description of the invention, when taken in conjunction with the accompanying drawings, in which.

DETAILED DESCRIPTION

Figure 1:
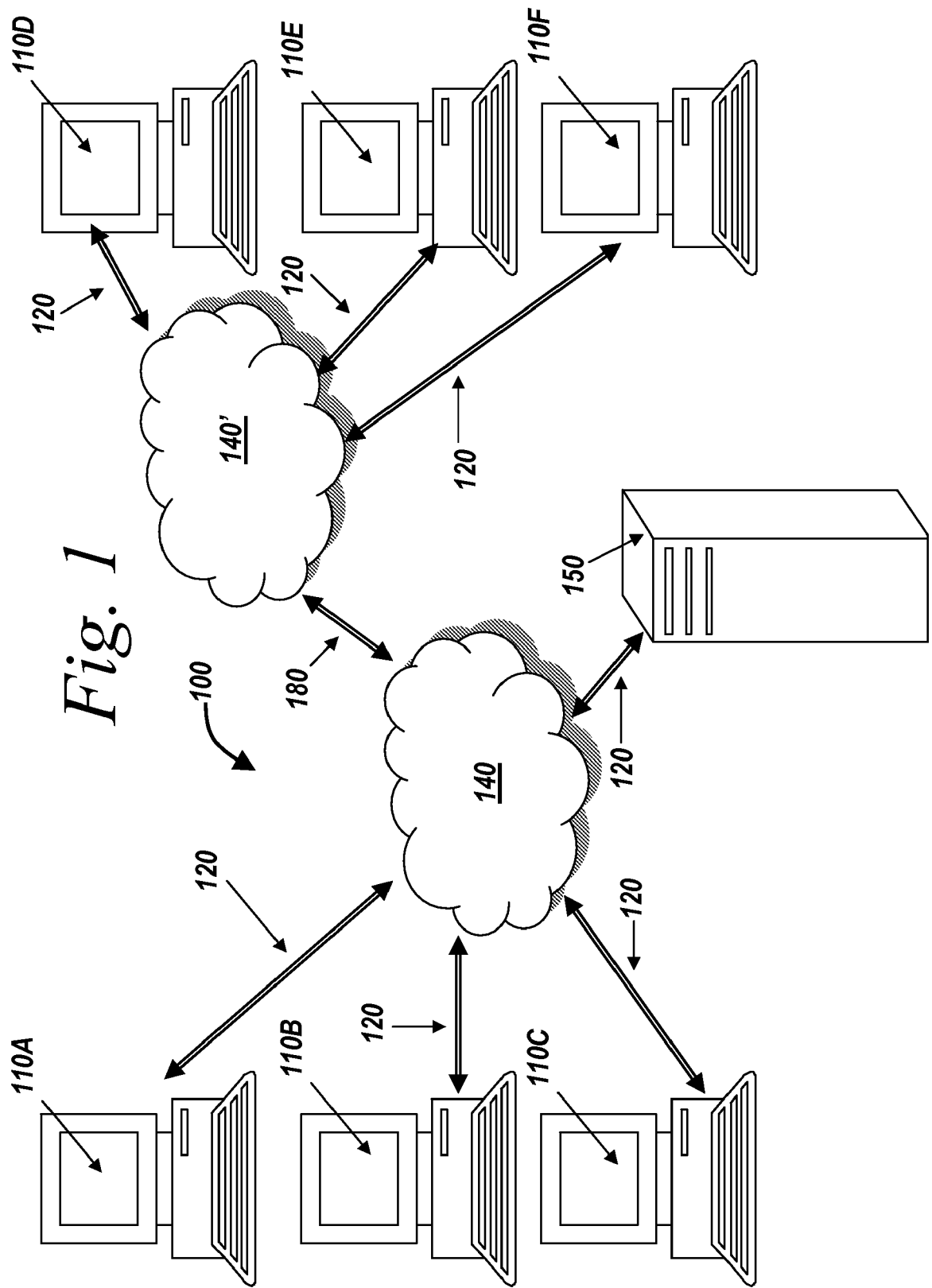
FIG. 1 shows an embodiment of distributed computing environment.

With reference to FIG. 1, a distributed computing environment 100, which can be used for on-line collaboration, presentation, and the like, includes one or more participant computing devices 110A, 110B, . . . , 110F (hereinafter each participant computing device or plurality of computing devices is generally referred to as participant 110) communicating with one or more server computing devices 150 (hereinafter each server computing device or plurality of computing devices is generally referred to as server 150) via a communications network 140. In the case of an on-line presentation environment, one of the participants 110 is typically a "presenter" while the other participants are "viewers". The presenter shares visual information, which is also referred to as screen data throughout the specification, with the viewers. Thought of another way, the presenter is a source node and the viewers are consumer nodes. Examples of visual information that may be shared include documents, files, slides, images, application displays, and entire computer desktop displays. In some embodiments, the visual data may also be accompanied by other data, including without limitation data files, executable files, and audio data. In some embodiments, the visual data may be accompanied by or comprise part of a videoconferencing data.

Participants 110 and servers 150 can communicate with one another via networks 140, which can be a local-area network (LAN), a metropolitan-area network (MAN), or a wide area network (WAN) such as the Internet or the World Wide Web. Participants 110 connect to the network 140 via communications link 120 using any one of a variety of connections including, but not limited to, standard telephone lines, LAN or WAN links (e.g., T1, T3, 56 kb, X.25), broadband connections (ISDN, Frame Relay, ATM), and wireless connections. The connections can be established using a variety of communication protocols (e.g., TCP/IP, IPX, SPX, NetBIOS, and direct asynchronous connections).

In other embodiments, the participants 110 and servers 150 communicate through a second network 140' using communication link 180 that connects network 140 to the second network 140'. The protocols used to communicate through communications link 180 can include any variety of protocols used for long haul or short transmission. For example, TCP/IP, IPX, SPX, NetBIOS, NetBEUI, SONET and SDH protocols or any type and form of transport control protocol may also be used, such as a modified transport control protocol, for example a Transaction TCP (T/TCP), TCP with selection acknowledgements (TCPSACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used. The combination of the networks 140, 140' can be conceptually thought of as the Internet. As used herein, Internet refers to the electronic communications network that connects computer networks and organizational computer facilities around the world.

The participant 110 can be any personal computer, server, Windows-based terminal, network computer, wireless device, information appliance, RISC Power PC, X-device, workstation, minicomputer, personal digital assistant (PDA), main frame computer, cellular telephone or other computing device that provides sufficient faculties to execute participant software and an operating system. Participant software executing on the participant 110 provides functionality directed to scaling the number of screen change data set receipt acknowledgements generated during an on-line presentation.

The server 150 can be any type of computing device that is capable of communication with one or more participants 110. For example, the server 150 can be a traditional server computing device, a web server, an application server, a DNS server, or other type of server. In addition, the server 150 can be any of the computing devices that are listed as participant devices. In addition, the server 150 can be any other computing device that provides sufficient faculties to execute server software and an operating system. Server software executing on the server 150 provides functionality directed to scaling the number of screen change data set receipt acknowledgements generated during an on-line presentation and storing, as well as distributing, screen change data sets, which are also referred to epochs throughout the specification.

Figure 2:
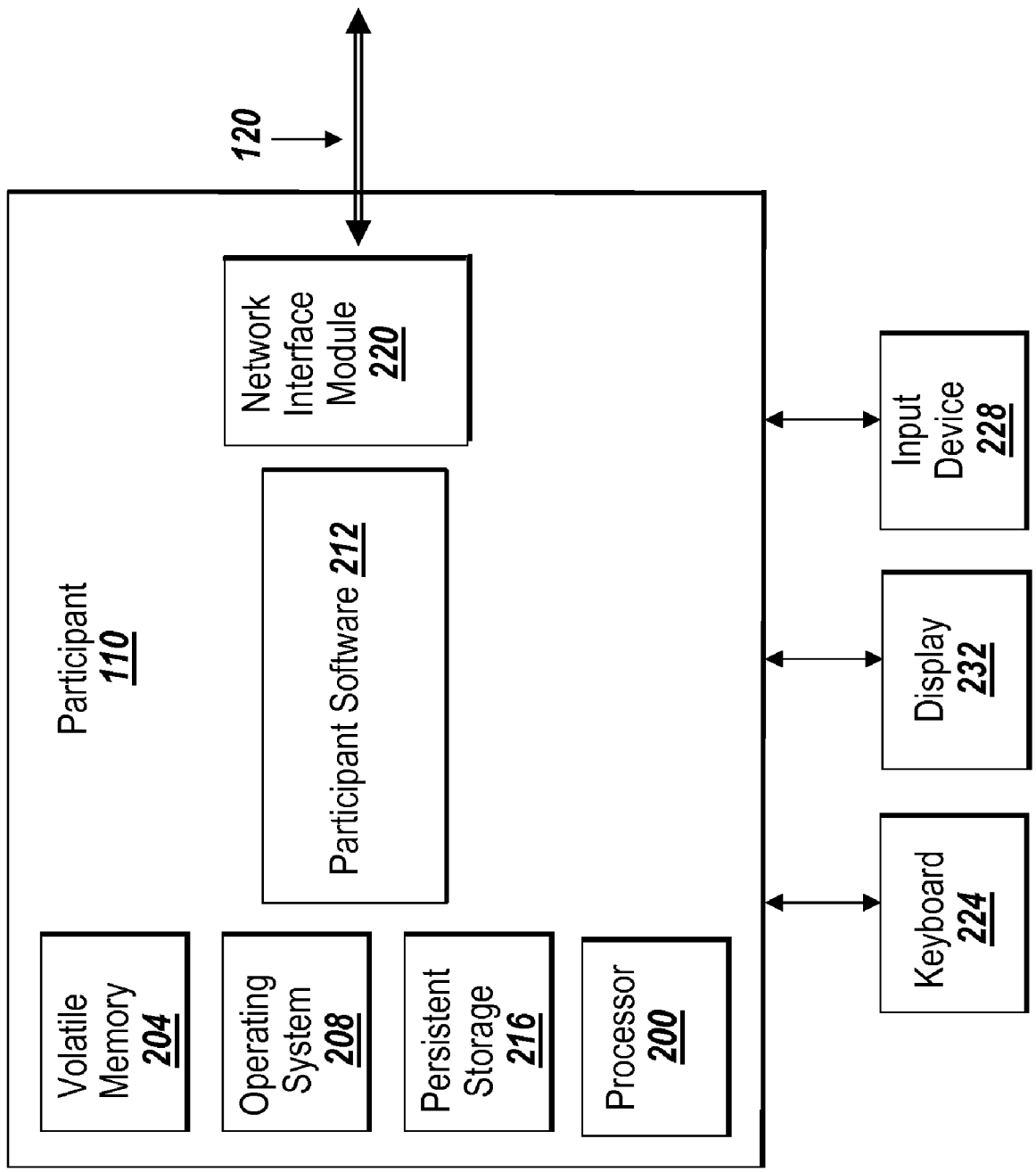
FIG. 2 shows an embodiment of a participant computing device of the distributed computing environment of FIG. 1.

FIG. 2 depicts a conceptual block diagram of a participant 110. It should be understood that other embodiments of the participant 110 can include any combination of the following elements or include other elements not explicitly listed. In one embodiment, each participant 110 typically includes a processor 200, volatile memory 204, an operating system 208, participant software 212, a persistent storage memory 216 (e.g., hard drive or external hard drive), a network interface 220 (e.g., a network interface card), a keyboard 224 or virtualized keyboard in the case of a PDA, at least one input device 228 (e.g., a mouse, trackball, space ball, light pen and tablet, touch screen, stylus, and any other input device) in electrical communication with the participant 110, and a display 232. The operating system 116 can include, without limitation, WINDOWS 3.x, WINDOWS 95, WINDOWS 98, WINDOWS NT 3.51, WINDOWS NT 4.0, WINDOWS 2000, WINDOWS XP, WINDOWS VISTA, WINDOWS LONGHORN, WINDOWS CE, MAC/OS, JAVA, PALM OS, SYMBIAN OS, LINSPIRE, LINUX, SMARTPHONE OS, the various forms of UNIX, WINDOWS 2000 SERVER, WINDOWS 2000 ADVANCED SERVER, WINDOWS NT SERVER, WINDOWS NT SERVER ENTERPRISE EDITION, MACINTOSH OS X SERVER, UNIX, SOLARIS, and the like. In addition, the operating system 208 can run on a virtualized computing machine implemented in software using virtualization software such as VMWARE.

The participant software 212 is in communication with various components (e.g., the operating system 208) of the participant 110 to provide functionality described herein. As a general overview, the participant software 212 can provides functionality directed to scaling the number of screen change data set receipt acknowledgements generated during an on-line presentation.

Figure 3:
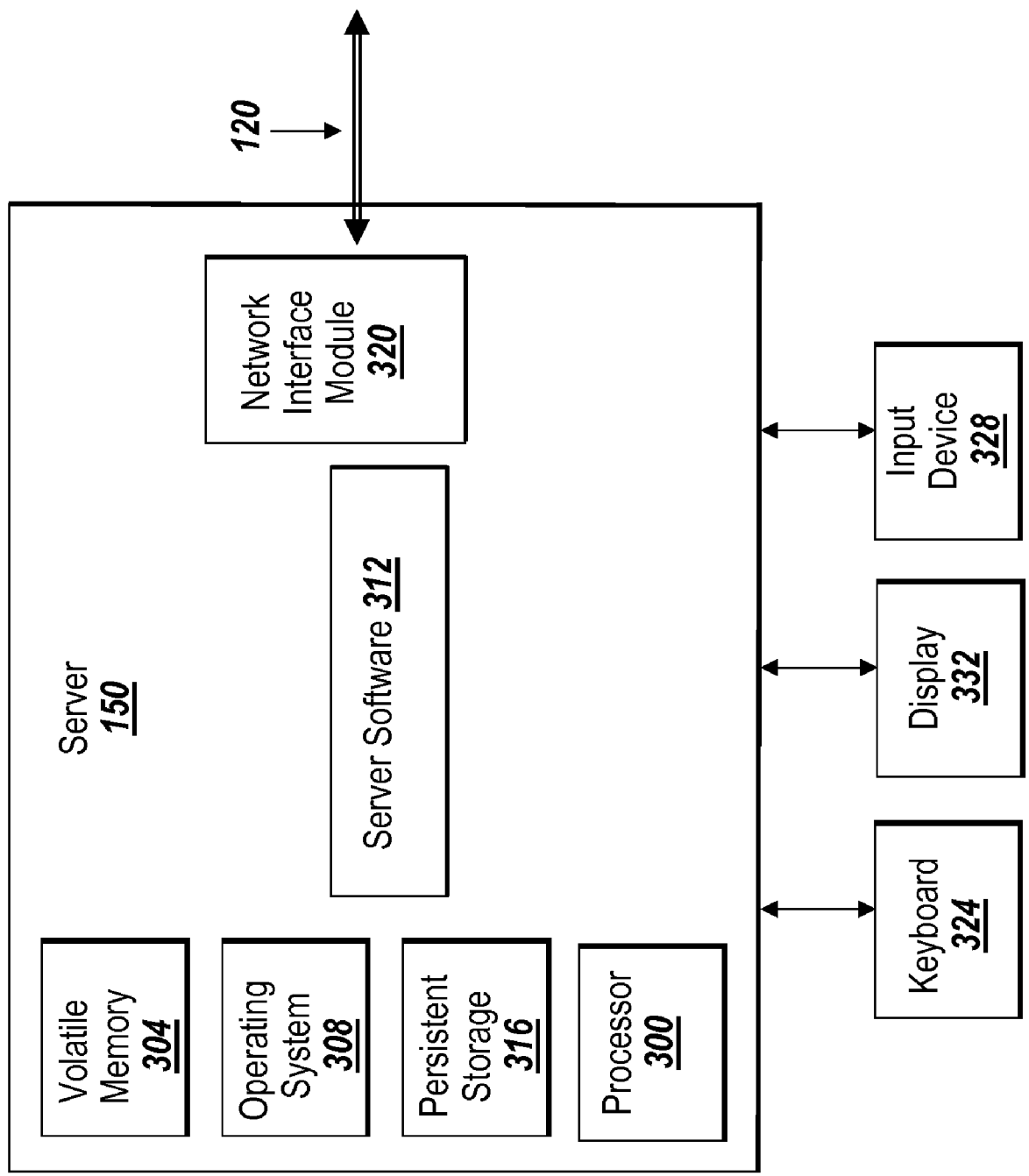
FIG. 3 shows an embodiment of a server computing device of the distributed computing environment of FIG. 1.

With reference to FIG. 3, an embodiment of a server 150 is described. It should be understood that other embodiments of the server 150 can include any combination of the following elements or include other elements not explicitly listed. The server 150 includes a processor 300, a volatile memory 304, an operating system 308, server software 312, persistent storage memory 316, a network interface 320, a keyboard 324, at least one input device 328 (e.g., a mouse, trackball, space ball, bar code reader, scanner, light pen and tablet, stylus, and any other input device), and a display 332. In another embodiment, the sever 150 operates in a "headless" mode. The server operating system can include, but is a not limited to, WINDOWS 3.x, WINDOWS 95, WINDOWS 98, WINDOWS NT 3.51, WINDOWS NT 4.0, WINDOWS 2000, WINDOWS XP, WINDOWS VISTA, WINDOWS LONGHORN, WINDOWS CE, MAC/OS, JAVA, PALM OS, SYMBIAN OS, LINSPIRE, LINUX, SMARTPHONE OS, the various forms of UNIX, WINDOWS 2000 SERVER, WINDOWS 2000 ADVANCED SERVER, WINDOWS NT SERVER, WINDOWS NT SERVER ENTERPRISE EDITION, MACINTOSH OS X SERVER, UNIX, SOLARIS, and the like. In addition, the operating system 308 can run on a virtualized computing machine implemented in software using virtualization software such as VMWARE The server software 312 is in communication with various components (e.g., the operating system 308) of the server 150 to provide functionality described in more detail below. As a general overview, the server software 312 provides functionality directed to scaling the number of screen change data set receipt acknowledgements generated during an on-line presentation. In certain embodiments, the server software 312 also provides synchronization of a data set among the participants 110.

Figure 4:
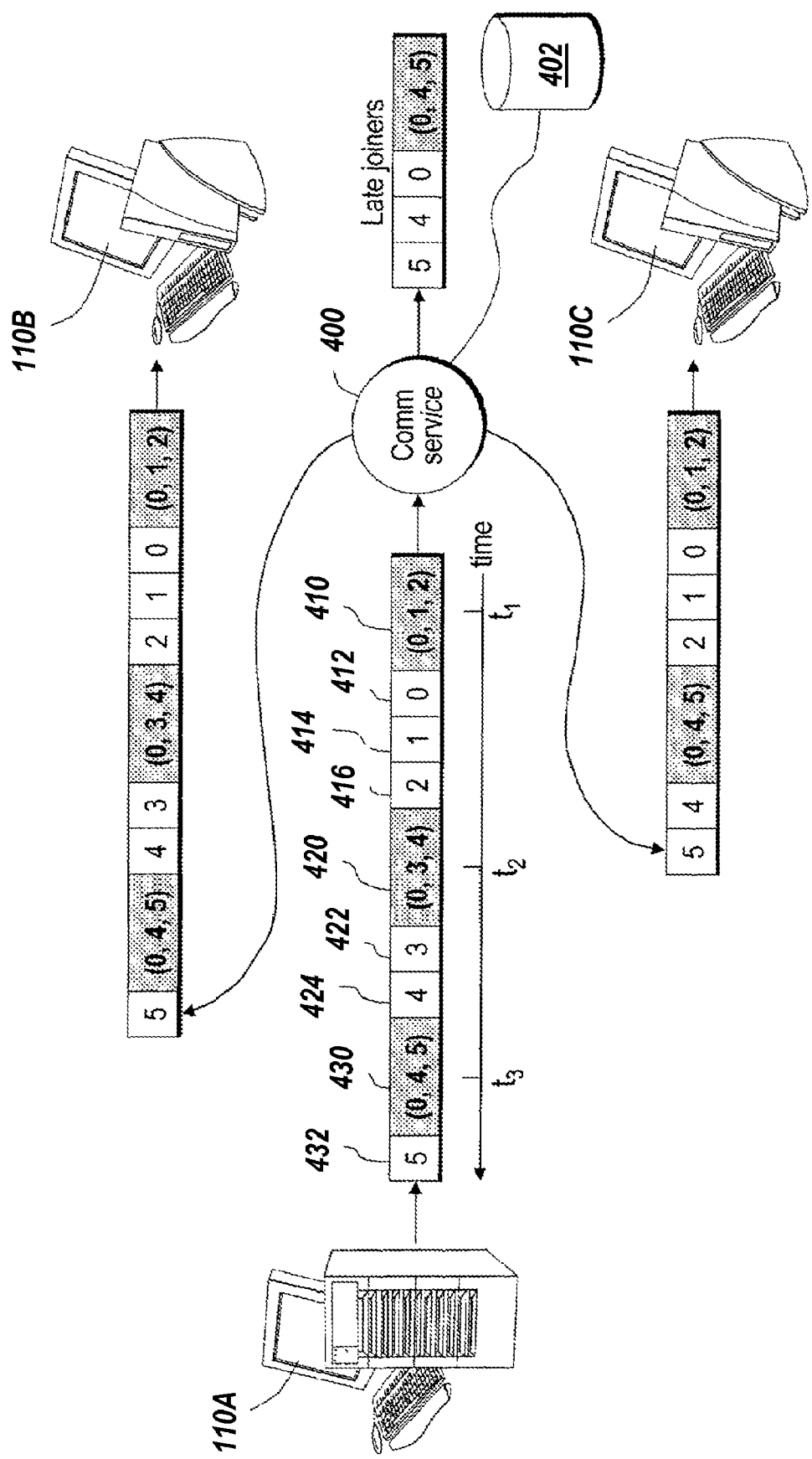
FIG. 4 is a block diagram of an embodiment of an architecture for synchronizing data sets between a presenter and plurality of viewers in a bandwidth-adaptive manner.

FIG. 4 depicts a block diagram of a system for synchronizing a data set between the source node 110A and a plurality of consumer nodes 110B, 110C, as well as the packet flow in a system during operation. As shown in FIG. 4, the system includes a communications service 400, which can be part of the server software 312, with which the source node 110A and the plurality of consumer nodes 110B, 110C communicate. The source node 110A and the consumer nodes 110B, 110C may be located behind respective firewalls (not shown in FIG. 4). The source node 110A and the consumer nodes 110B, 110C make outgoing socket connections to the communications service 400. In some embodiments, the communications service 400 maintains state for each connection to a consumer node 110B, 110C in the form of socket descriptors. In other embodiments, the source node 110A and the communications service 400 may be provided as the same physical device. In these embodiments, the source node 110A and the communications service 400 operate on the same hardware in a time-shared manner. Data may be shared between the source node 110 and the communications service 400 using any one of a number of techniques, such as pipe objects or shared memory.

The source node 110A codes the current state of a dynamic data set, such as screen data that is shared among the participants 110, as a set of data packets. In some embodiments, this coding process is straightforward. For example, in the case where the dynamic data set is screen data, data packets may be coded by storing pixel values for a predetermined portion of the screen in the data packet. In some embodiments, the source node 110A compresses the data stored in the data packets. In still other embodiments, the source node 110A encrypts the data stored in the data packets. In still further embodiments, the source node 110A both encrypts and compresses data stored in the data packets. As the dynamic data set changes, the source node updates the set of data packets comprising the current state of the data set. At any point in time, the state of the dynamic data set can be thought of an epoch.

The source node 110A transmits the current state of the dynamic data set to the communications service 400 in a bandwidth-adaptive manner. In one embodiment, this is achieved by requiring the source node 110A to possess a transmission token before beginning transmission of the current state of the data set. In this embodiment, the source node 110A and the communications service exchange a limited number of transmission tokens, e.g., five. In other embodiments, the communication service 400 transmits a message to the source node 110A to notify the source node 110A when it can send another data set update.

As shown in FIG. 4, the communications service 400 may also include a data storage element 402, such as random-access memory, a disk drive, a disk array, a rewriteable optical drive, or some other form of memory element that allows access to stored data. The storage element 402 enables the communications service 402 to store metadata information and data packets received from the source node 110A in between update requests from various consumer nodes 110B, 110C. In addition, the storage element 402 can be used to maintain a historical record of metadata information and data packets transmitted from the source node 110A. In other embodiments, the storage element 310 may also store the data packets transmitted to a respective consumer node 110B, 110C.

The source node 110A creates metadata information that identifies each of the data packets representing the current state of the dynamic data set. In the embodiment shown in FIG. 4, the metadata information comprises a metadata packet 410, 420, 430. Metadata packet 410 is created at time t1, and indicates that the state of the dynamic data set at time t1 is represented by data packet 0, data packet 1, and data packet 2. Similarly, metadata packet 430 indicates that state of the dynamic data set at time t2 is represented by data packet 0, data packet 4, and data packet 5. In other embodiments, instead of creating metadata packets that store metadata information, metadata information is included in data packets. For example, each data packet comprising a data set update may include a "metadata information header" identifying the update set with which the data packet is associated.

As shown in FIG. 4, the source node 110A transmits metadata information 410 to the communications service 400 followed by the data packets identified by the metadata information 410. Thus, the source node 110A transmits to the communications service 400 data packet 0 412, data packet 1 414, and data packet 2 416 following the metadata packet 410. At time t2, the source node 110A transmits to the communications service 400 metadata packet 420, which indicates that the state of the data set at time t2 is represented by data packet 0, data packet 3, and data packet 4. The source node 110A then transmits data packet 3 422 and data packet 4 434 to the communications service 400. The source node 110A does not retransmit data packet 0 to the communications service 400 since that data packet was transmitted in connection with the first metadata packet 410. Similarly, at time t3 the source node 110A transmits to the communications service 400 a metadata packet 430 that indicates the current state of the dynamic data set is represented by data packet 0, data packet 4, and data packet 5. Since the source node 110A already transmitted data packet 0 to communications service 400 following the first metadata packet 410 and data packet 4 following the second metadata packet 420, the source node 400 only transmits data packet 5 432 following the third metadata packet 430.

As described above in connection with flow control between the source node 110A and the communications service 400, flow control between the consumer nodes 110B, 110C and the communications service 400 may be token-based or message-based. For ease of reference, the remaining description will assume that the flow control method is based on messages. However, the same advantages of the invention can be obtained in a system relying on transmission tokens.

FIG. 4 depicts an embodiment of a system in which consumer node 110B, communicates with the communications service 400 via a high-bandwidth connection. In this case, the consumer node 110B requests data set updates frequently enough that the communication service 400 transmits to the consumer node 110B a stream of metadata information and data packets identical to the stream of metadata information and packets received by the communications service 400 from the source node 110B. Also as shown in FIG. 4, the consumer node 110C, which communicates with the communications service 400 via a low-bandwidth connection, requests data set updates less frequently and, therefore, receives a different stream of packets from the communications service 400 than the communications service 400 receives from the source node 110A. As shown in FIG. 4, the communications service 400 transmits the first metadata packet 410 and data packets 0-3, 412, 414, 416 to the consumer node 110C. The next metadata packet received by the consumer node 110C is the third metadata packet 430, which indicates that the state of the dynamic data set is represented by data packet 0, data packet 4, and data packet 5. Since the consumer node 110C has not yet received data packet 4 and data packet 5, the communications service 400 transmits those data packets to the consumer node 110C.

FIG. 4 also depicts the packet stream sent to a consumer node that "joins late." As shown in FIG. 4, a consumer that joins at time t3 will receive the third metadata packet 430, as well as all the data packets identified by the third metadata packet. The data packets transmitted to the consumer node 110B, 110C by the communications service 400 may be retrieved from the storage element 410, recently received from the source node 110A, or some combination of the two.

Delivery of data set updates from the communications service 300 may be performed using a "push" model, a "pull" model, or an "atomic push" model. In the "push" models, the communication service 400 transmits metadata information and data packets to the consumer node 110B, 110C. The difference between the "push" model and the "atomic push" model is that, in the "atomic push" model, the communications service 400 commits to transmit every data packet identified by transmitted metadata information before beginning transmission of another data set. There is no such commitment in the "push" model, which means that data packets not successfully transmitted from a previous data set update may never be sent to the consumer node 110B, 110C. In the "pull" model, the consumer node 110B, 110C receives from the communications service 400 the metadata information and then requests specific data packets from the communications service 400.

In certain embodiments, the information in metadata packets is encoded incrementally. In these certain embodiments, the "wire" representations of metadata packets may differ despite the fact that they encode the same information. A short example shows why this is the case. Over time, the source node 110A sends three metadata packets to the communications service 400. The contents of the metadata packets are sets of data packet numbers (1, 2, 3), (2, 3, 4) and (3, 4, 5). On the "wire," each set is represented as a delta from the previous set. Thus, the source node 110A transmits the following metadata packets to the communications service 400: (1, 2, 3), (−1, +4) and (−2, +5), where '−' and '+' indicate removal or addition of a packet number from/to the previous set. These data sets can be conceptually thought of "change data sets." As used herein, a change data set refers to a set of data the represents changes in the screen data of the presenter from one point in time to another point in time. If a consumer node 110 skips the contents of the second metadata packet, it receives metadata information describing sets (1, 2, 3) and (3, 4, 5). On the "wire," these two sets are represented incrementally as (1, 2, 3) and (−1, +4, −2, +5). While the source node 110A transmitted the contents of the second metadata packet to the communications service 400 as (−2, +5), the communications service 400 transmitted the same information to the consumer node 110 as (−1, +4, −2, +5).

In one some embodiments, each time a consumer node 110 receives a change data set, the consumer node acknowledges receipt of the changed data set by sending a response to the source node 110 or communication server 400. However, as the number consumer nodes increases the number of acknowledgement receipts can adversely affect the performance of the on-line presentation environment. Various methods can be used to limit or scale the number of acknowledgement receipts received by the presenter 110A or communication server 150. For example, only certain change data sets can be acknowledged as received by all or some of the viewers. Another example includes acknowledging receipt of all change data sets by a select number of viewers.

In one embodiment, in addition to providing packet numbers the change data sets can include other data and information. For example, the change data sets include a "tag" or "flag" (not shown) that provides an indication to a viewer 110B to acknowledge receipt of the change data set. In various embodiments, a select number viewers provide an acknowledgement receipt to the presenter 110A or communication server 150.

Figure 5:
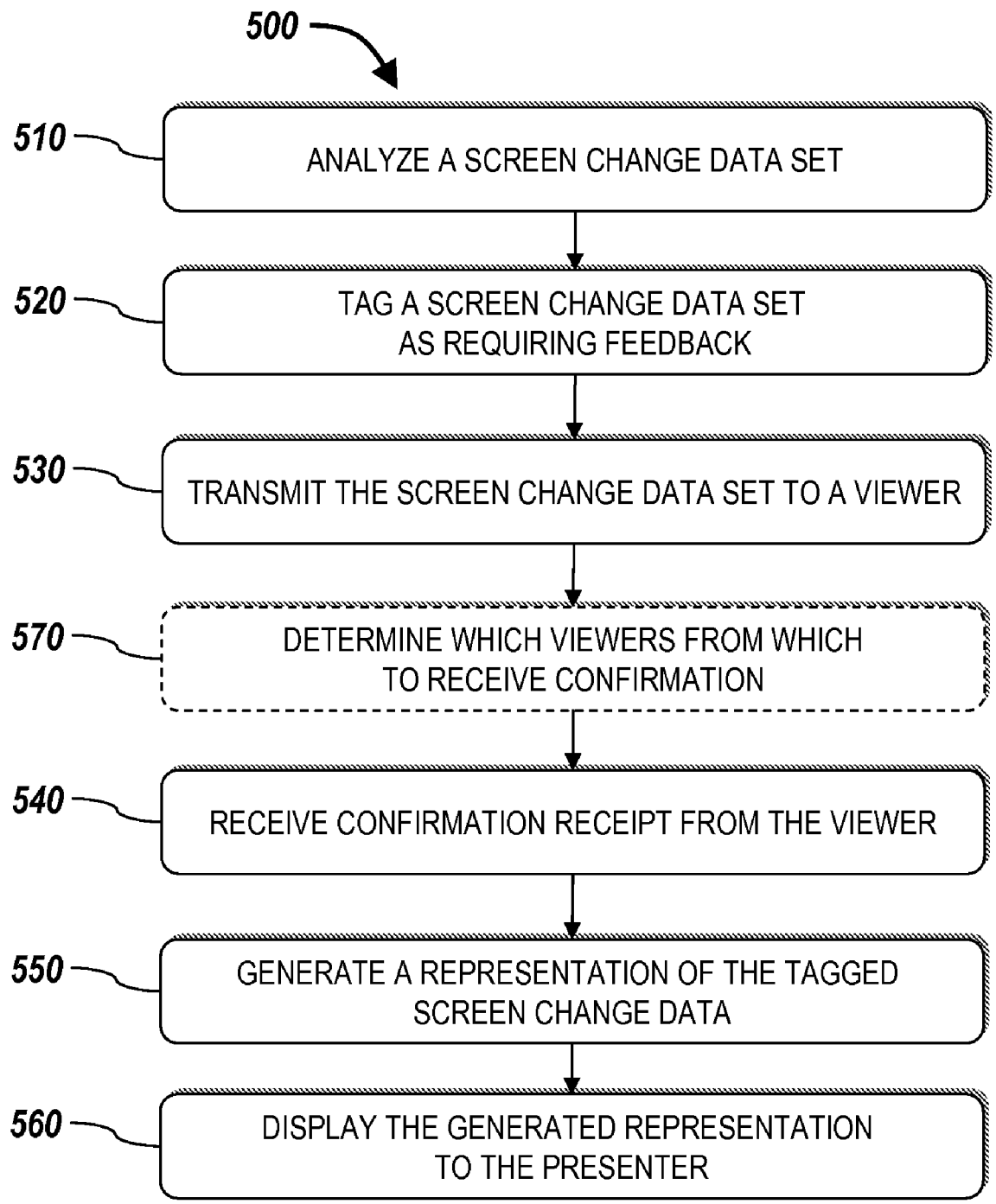
FIG. 5 is a flow chart of an embodiment of a method of scaling the number of viewers that provide acknowledgement receipts related a screen change data set.

With reference to FIG. 5, an embodiment of a method 500 of providing visual feedback to the presenter 110A by scaling the number of confirmation receipts of screen change data from the one or more viewers 110B. The method includes analyzing (STEP 510) a screen change data set at a first computing device of the on-line presentation environment 100, tagging (STEP 520) the screen change data set as requesting acknowledgement by the viewers 110B, and transmitting (STEP 530) the screen change data set to the viewers 110B. The method also includes receiving (STEP 540) a confirmation of receipt of the tagged screen change data set from at least one viewer 100B, generating (STEP 550) a representation of the tagged screen change data set in response to receiving the confirmation of receipt, and displaying (STEP 560) the generated representation at the presenter 110A. In other embodiments, the method includes determining (STEP 570) one or more viewers 110B to confirm receipt of the tagged screen change data set.

In one embodiment, the presenter 110A analyzes (STEP 510) the screen change data set. In other embodiments, the communication server 150 analyzes (STEP 510) the screen change data set. In yet another embodiment, one or more of the viewers 110B analyzes (STEP 510) the screen change data set. The analysis can take various forms. In one embodiment, the analysis determines whether the amount of changes to the screen of the present are larger enough to warrant feedback about the receipt of the screen change data set. In another embodiment, a periodic function is used as the analysis function. For example, every third screen change data set can be used to provide feedback to the presenter 110A. In other embodiments, the analysis includes randomly assigning screen change data sets for acknowledgement receipt.

In other embodiments, different criteria are used in the analysis. For example, the bandwidth connecting the server 150 and the presenter 110A as well as the bandwidth connecting the server 150 and a viewer 110B is used to determine whether to request acknowledgement of the screen change data set. However, the above-described bandwidth adaptive of nature of the connections complicates the situation. Assume the system is configured to request acknowledgement for large updates, a large update followed by a series of small ones are seen differently by different viewers 110B. Certain viewers 110B may see all updates while others only a subset. The presenter may erroneously thinks that the viewers 110B are viewing different screen change data sets. To account for this situation, the method tags (STEP 520) certain screen change data sets.

In one embodiment, the participant software 212 tags (STEP 520) the desired screen change data sets. Either the presenter 110A or the viewers 110B can tag screen change data sets. In another embodiment, the server software 312 tags (STEP 520) the screen change data sets. The tagging can take various forms. For example, a field in the metadata of the screen change data set can be populated. Another example include assigned a unique identifier to each screen change data set. The assigned unique identifier can include an indication that acknowledgement is requested. For example, each unique identifier that is an odd number can indicate a request for acknowledgment. In addition, the content of the change data set can trigger tagging. For example, the tagging can be based on a region of change, properties of change data set, which can include color, frequency, and the like. Also the tagging can be based on a timer, a rate of update, randomization, and the like.

Each screen change data set that is tag does not have to be acknowledge. Often, some of the updates will be not be acknowledge. This is expected given the bandwidth-adaptive nature of the described system. To explain further, if an acknowledgement receipt is received for a specific screen update it means that none of the viewers 110 received that screen change data set. For example, assume the presenter is displaying and sharing a that generates ten updates per second, all of which are tagged. In some situations, the viewers 110B might only receive three or four updates per second. Some of the updates are never received by the viewers so they are never acknowledged. In fact, the acknowledgement feedback allows the presenter 110A to know precisely which updates viewers 110 received and, for each update, the specific fraction of all viewers that received. This fraction can be a number between zero and one.

The presenter 110A or communication server 150 transmits (STEP 530) the screen change data sets to the viewers 110B using one of the previously described methods. In one embodiment, a "push" mechanism is used. In other embodiments, an "atomic push" or "pull" technique is used.

In one embodiment, the presenter 110A receives (STEP 540) an acknowledgement receipt from one or more of the viewers 110B. In another embodiment, the communication server 150 receives (STEP 540) the acknowledgment receipt from the viewers 110B. The communication server 150 can acknowledge the updates to the presenter as the communication server 150 delivers the updates to the viewers 110B. The communications server 150 can also acknowledge the updates by individual viewers 110B or by aggregating the collective contributions.

In one embodiment, after receiving the acknowledgment receipt from the viewer 110B the presenter 110A generates (STEP 550) a representation of the tagged screen change data set that was received by the viewer 110B. In another embodiment, the communication server 150 generates (STEP 550) the representation and transmits the representation to the presenter 110A, which displays (STEP 560) the representation. The representation can take various forms, some of which are described in more detail below with respect to FIG. 6 through FIG. 11.

As mentioned previously, various embodiments of the method include determining (STEP 570) the viewers 110B that will provide acknowledgment receipts for the tagged or untagged change data sets. There are various methods and means that can be used to determine which viewers to receive acknowledgment receipts from, which are used to generate the visual representation that is displayed at the presenter 110A. In one embodiment, if the bandwidth connecting a viewer 110B to the server 150 exceeds a predetermined threshold then that viewer is designated to send acknowledgement receipts. Other criteria can also be used. Examples, include but are not limited to a participant identifier, geographic location, and the order in which the viewer joined the on-line presentation. In another embodiment, the viewers 110B that provided acknowledgement receipts are selected by the end-user of the presenter 110A. In yet another embodiment, the viewers 110B are randomly assigned.

In other embodiments, the viewers 110B themselves make a determination if they will provide an acknowledgement receipt. The viewers 110B can use any of the previously mentioned criteria, as well as criteria that is not mentioned, in determining whether to provide an acknowledgment receipt to the presenter 110A or communication server 150.

The determining can occur (STEP 570) at the beginning of the on-line presentation. This provides a static group of viewers 110B that provide feedback. In other embodiments, the determining can occur at regular or random intervals during the on-line presentation. As such, the set of viewers 110B that provide feedback is dynamic.

Figure 6:
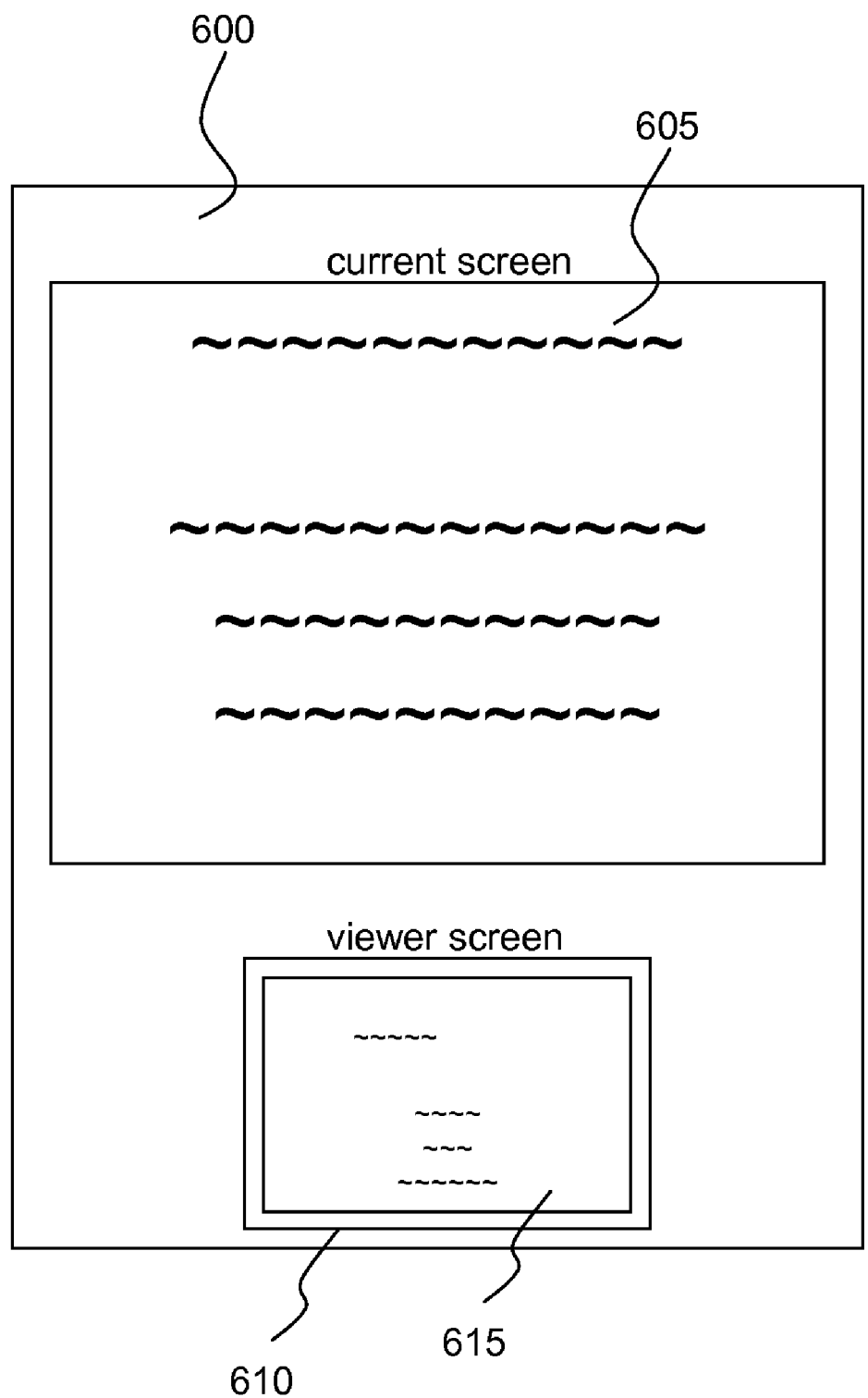
FIG. 6 is a block diagram depicting one embodiment of a display providing to a presenter visual feedback regarding the screen data received by a viewer.

Referring now to FIG. 6, a block diagram depicting one embodiment of a display providing a representation to a presenter 110A visual feedback regarding the screen data received by a viewer 110B is shown. In brief overview, a display 600 comprises a window for displaying the current shared visual display 605 and a window 610 for displaying visual feedback regarding the screen data received and acknowledge by a viewer 615.

Still referring to FIG. 6, now in greater detail, a presenter display screen 600 comprises a window for displaying the current shared visual display 605. The shared visual display may comprise any visual data described herein, including without limitation slides, documents, files, images, an application, or a computer desktop. In some embodiments, the current shared visual display may not be displayed in a window 605, but may instead comprise the entirety of the presenters 110A screen. In other embodiments, the current shared visual display may not be displayed in a window 605, but may instead comprise the entirety of the presenter's screen, excluding a given number of windows or other visual information. For example, the current shared visual display may comprise the entirety of the presenter's screen with the exception of the window for displaying visual feedback regarding the screen data received by a viewer 610. Or, for example, the current shared visual display may comprise the entirety of the presenters screen with the exception of other visual information corresponding to presentation management functions.

A presenter display screen 600 may also comprise a window 610 for displaying visual feedback regarding the screen data received by a viewer 615. In the embodiment shown, the window 610 comprises a display of the screen data for which a viewer has confirmed receipt 615.

In some embodiments, the visual feedback 615 may be updated periodically. In one embodiment, the visual feedback 615 may be updated at given time intervals, including without limitation any number of microseconds, milliseconds, seconds, or minutes. In another embodiment, the visual feedback 615 may be displayed only in periods following a change in the shared visual display. For example, the window 610 may be hidden or minimized if no changes have been made to the shared visual display 605 for a given time interval. Thus, for example, a presenter may discuss a document for a number of minutes, and then make changes in the document. Upon the presenter's making changes, the window 610 displaying the visual feedback 615 may appear to inform the presenter whether the viewer has successfully received the visual updates.

In the embodiment shown, the display 600 indicates that the screen data received by a viewer 615 may be different than the current shared visual display 605. This discrepancy may reflect, for example, that the presenter recently changed slides, and the viewer has yet to receive or confirm receipt of the visual data corresponding to the most recent slide. Or the discrepancy may reflect, for example, that the presenter recently typed text into the shared visual display, and the viewer has yet to receive or confirm receipt of the visual data corresponding to the entered text.

In some embodiments, the visual feedback display may be modified 615, such as reduced in size, reduced in color bit depth, and rendered in black and white or grayscale. In other embodiments, any other display property of the screen data shown in the feedback display 615 may be altered, including without limitation color, contrast, sharpness, and brightness. In other embodiments, the presenter machine may generate a visual representation of the screen data received by the viewer using any combination of techniques described herein. For example, the presenter machine may generate a display corresponding to the current screen data confirmed as received by a given viewer, where the display is rendered at ⅕th size, and in black and white.

Figure 7:
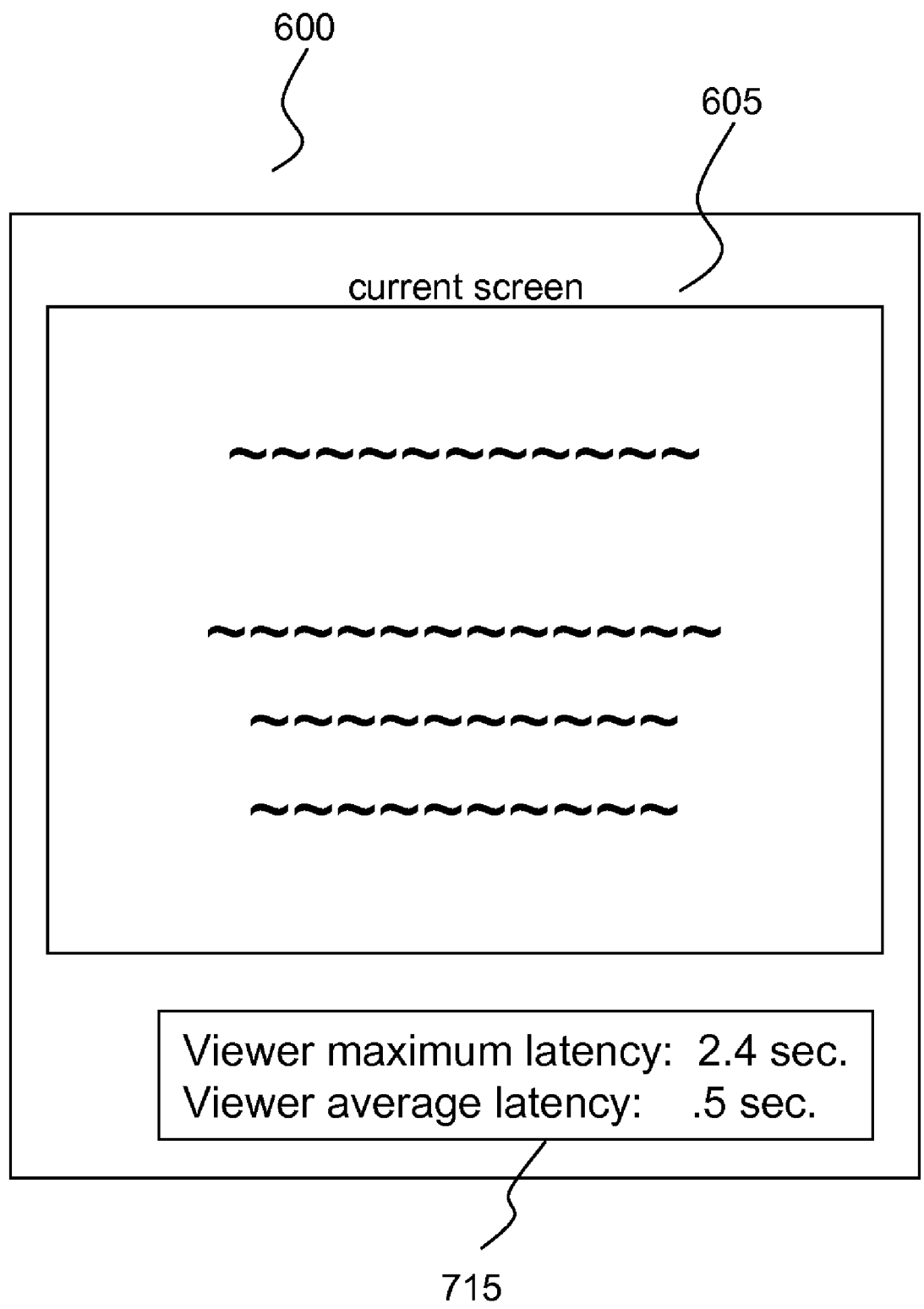
FIG. 7 is a block diagram depicting one embodiment of a display providing to a presenter visual feedback regarding the screen data received by a plurality of viewers.

Referring now to FIG. 7, a block diagram depicting one embodiment of a display providing to a presenter visual feedback regarding the screen data received by a plurality of viewers is shown. In brief overview, a display 600 comprises a window for displaying the current shared visual display 605 and visual feedback regarding the screen data received by a plurality of viewers 715.

Still referring to FIG. 7, now in greater detail, visual feedback regarding the screen data received by a plurality of viewers 715 comprises a display of latency corresponding to a plurality of viewers. In some embodiments, any measure of latency may be displayed, including without limitation minimum latency, maximum latency, mean latency, median latency, and mode latency. In some embodiments, latency corresponding to a specific viewer or viewers may be displayed.

In some embodiments, the displayed latency may reflect the time between the time the presenter makes a change to the shared visual display 605 and the time that confirmation is received by the presenter that the change has been received by one or more predetermined viewers. In other embodiments, the displayed latency may reflect the time between the time that the presenter makes a change to the shared visual display 605 and the time that the change is received by one or more predetermined viewers.

In some embodiments, the latency may be displayed using text, as in the embodiment shown. In other embodiments, latency may be displayed using any technique for the display of data, including without limitation charts, graphs, histograms, plots, color coding, and icons. For example, a mean latency indicator may be displayed which is green while average latency is low, but transitions to red as latency increases.

In other embodiments, other statistics relating to the transmission of screen data may be displayed, including without limitation estimated bandwidth, network loss rates, and total number of viewers who have not received a given change.

Figure 8:
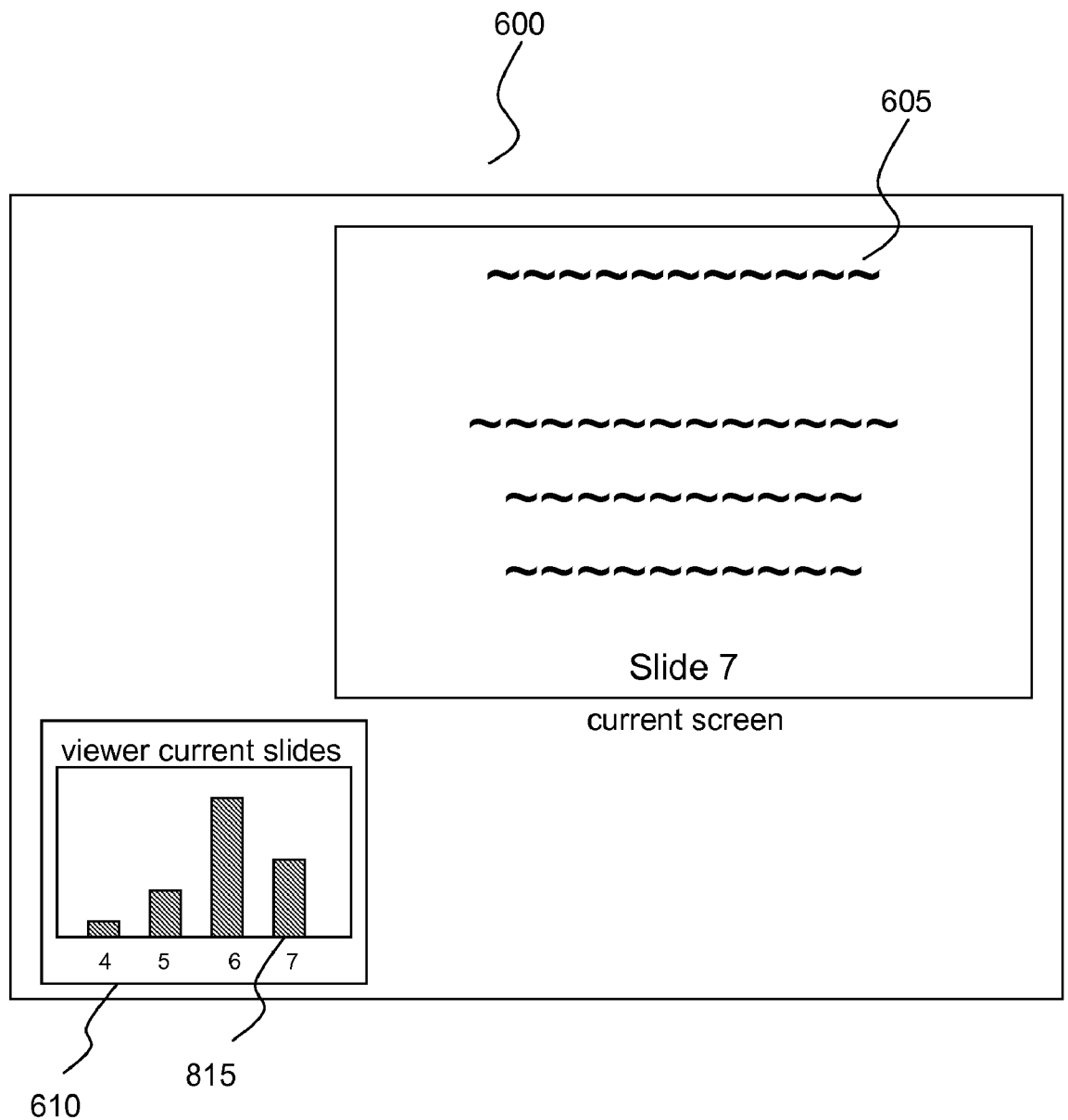
FIG. 8 is a block diagram depicting another embodiment of a display providing to a presenter visual feedback regarding the screen data received by a plurality of viewers.

Referring now to FIG. 8, a block diagram depicting another embodiment of a display providing to a presenter visual feedback regarding the screen data received by a plurality of viewers is shown. In brief overview, a display 600 comprises a window for displaying the current shared visual display 605 and a window 610 for the display of a chart corresponding to the screen data received by a plurality of viewers 815.

Still referring to FIG. 8, now in greater detail, a display of visual feedback regarding the screen data received by a plurality of viewers 815 comprises a chart indicating how many viewers have received given screen data. In the embodiment shown, the shared visual display 600 corresponds to a slide presentation. The visual feedback 815 displays the percentage of viewers who have received a given slide. For example, in the embodiment shown, the current shared visual display is slide number 7. The chart 815 illustrates that a significant number of viewers have not yet received the data corresponding to the change to slide 7. The chart 815 further illustrates that most of the viewers may still be currently viewing slide 6, although a smaller fraction of users may still be viewing slides 5 and 4, respectively.

In other embodiments, the visual feedback 815 may comprise a chart displaying other data regarding the screen data received by viewers. In one embodiment, a chart may display the absolute number of viewers who have received a given change to screen data. In another embodiment, a chart may display any measure of latency as discussed herein.

In other embodiments, any chart type may be used, including without limitation a bar graph, line graph, xy plot, scatter plot, histogram, or pie chart. In still other embodiments any other visual representation of data may be used, including without limitation icons, color-codes, and graphics.

Figure 9:
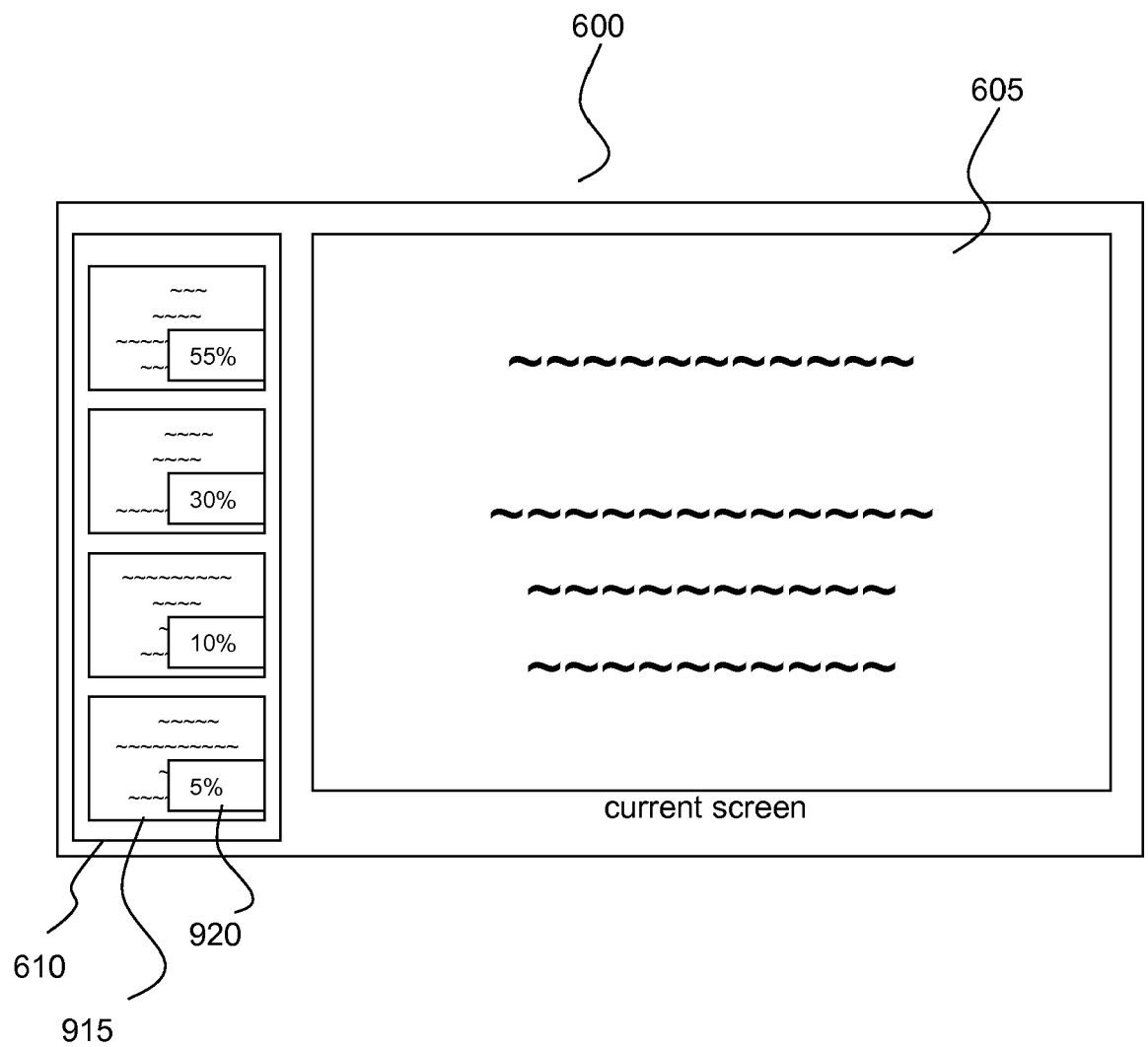
FIG. 9 is a block diagram depicting another embodiment of a display providing to a presenter visual feedback regarding the screen data received by a plurality of viewers.

Referring now to FIG. 9, a block diagram depicting another embodiment of a display providing to a presenter visual feedback regarding the screen data received by a plurality of viewers is shown. In brief overview, a display 600 comprises a window for displaying the current shared visual display 605 and a window 610 for the display of visual feedback regarding the screen data received by a plurality of viewers 915.

Still referring to FIG. 9, visual feedback regarding the screen data received by a plurality of viewers 915 comprises a number of simulated displays with percentages attached indicating what percentage of viewers may be currently displaying the simulated display. In some embodiments, any number of simulated displays and percentages may be displayed. In one embodiment, simulated displays and percentages may be displayed corresponding to a series of changes in display data. For example, in the embodiment shown, the presentation comprises a slide show, and the four simulated displays may comprise the four most recent slides. The displayed percentages may indicate, for example, that 55% of viewers have confirmed receipt of the change in visual data corresponding to the most recent slide. The displayed percentages may also indicate, for example, that 5% of the viewers have yet to acknowledge receipt of the changes corresponding to the three most recent slides, and thus still may be viewing the slide shown three slides ago.

Figure 10:
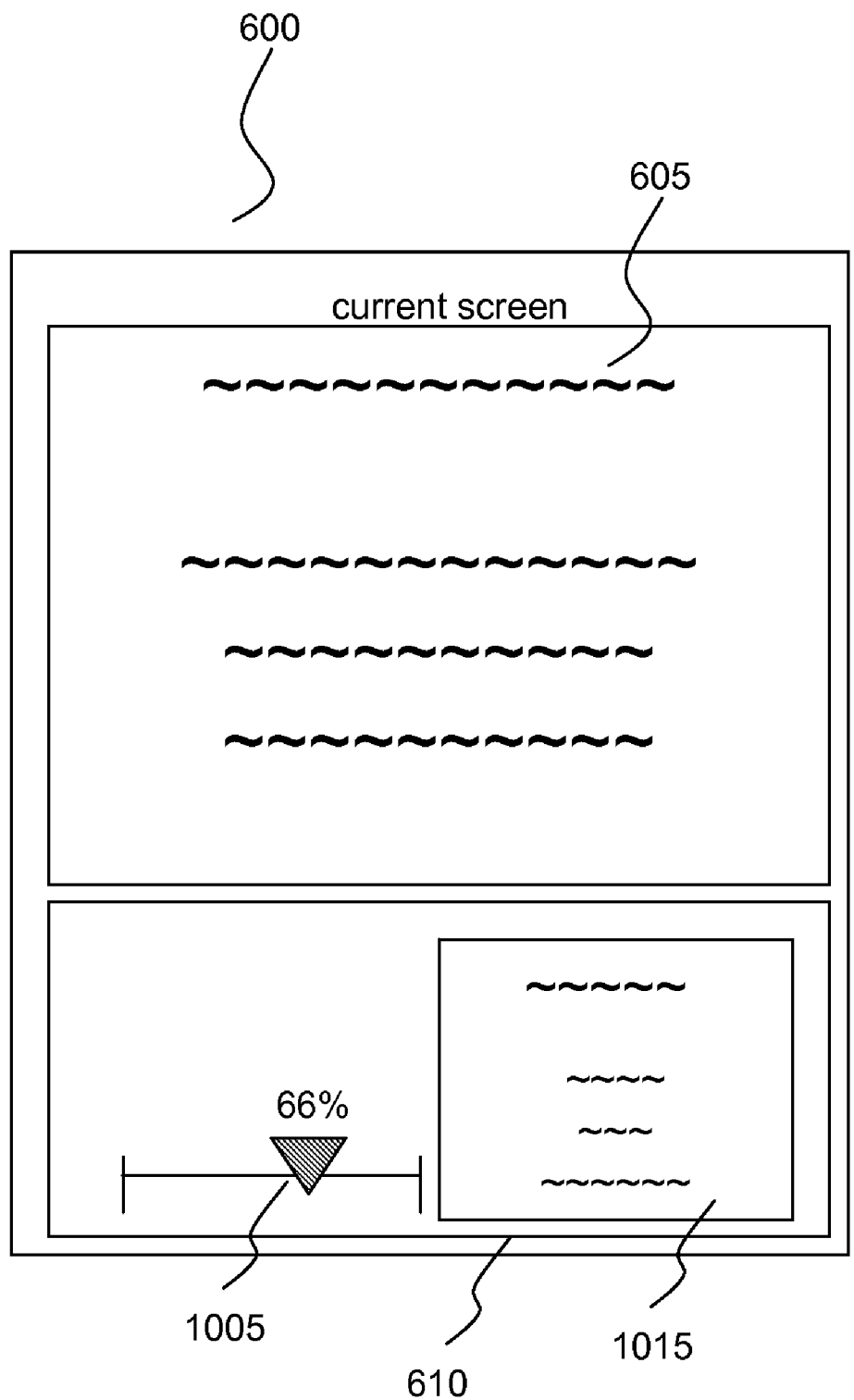
FIG. 10 is a block diagram depicting an embodiment of a display providing to a presenter visual feedback regarding the screen data received by a plurality of viewers in response to input from the presenter.

Referring now to FIG. 10, a block diagram depicting an embodiment of a display providing to a presenter visual feedback regarding the screen data received by a plurality of viewers in response to input from the presenter. In brief overview, a display 600 comprises a window for displaying the current shared visual display 605 and a window 610 for the display of visual feedback regarding the screen data received by a plurality of viewers 1015. The window 610 also comprises an input mechanism for a presenter to specify a given percentage of viewers.

Still referring to FIG. 7, now in greater detail, a window 610 for the display of visual feedback regarding the screen data received by a plurality of viewers comprises an input mechanism for a presenter to specify a given percentage of viewers. In the embodiment shown, a slider 1005 can be set to a given percentage. The feedback display 1015 then displays the most recent visual change confirmed as received by the given percentage of users. For example, a presenter to a large number of viewers might want to know when 80% of the viewers have received a given change in visual data. The presenter could then set the slider to 80%, and observe the most recent visual change confirmed as received by 80% of the audience.

In other embodiments, the input device may comprise any other input mechanism, including without limitation a button, radio buttons, text field, and menu. For example, a presenter may use a menu to select a given percentage of viewers. Or for example, a menu could be used to select a given viewer or plurality of viewers, and the feedback display 1015 may then show the visual changes currently confirmed as received by that particular viewer or plurality of viewers.

In other embodiments, previously or currently shared screen data may be selected to be tracked. In one embodiment, a button or other input device may be provided which allows the presenter to take a 'snapshot' of the presenter's current screen to select the shared screen data to be tracked. In another embodiment, the screen data to be tracked may be automatically selected. For example, the presenter machine may select the screen data to be tracked by a statistical computation using the confirmations of receipt received from the viewers such as, for example, identifying the screen data for which a plurality of the most recent receipts received correspond.

The percentage of viewers (or any other statistical measure of viewers) that have confirmed the screen data being tracked may then be visualized in any manner described herein. In the embodiment shown, the selected screen data to be tracked is displayed in window 315 and the percentage of viewers that have confirmed the selected visual change is visualized using a read-only slider 1005. Or for example, clicking on feedback display 1015 might bring up a list of the particular viewers corresponding to the given feedback. The presenter may then be able see how many viewers have currently received at least the visual data corresponding to that particular 'snapshot'."

In some embodiments, an input device may be combined with any of the other feedback displays described herein. For example, the bar graph 815 in FIG. 8 might be made interactive, such that if a presenter clicked on a given bar, the screen may display a visual representation of the visual changes confirmed as received by the group of viewers corresponding to the bar clicked. Or for example, clicking an individual feedback displays 915 in FIG. 9 might bring up a list of the particular viewers corresponding to the given feedback. Or for example, a button may be provided which allows the presenter to take a 'snapshot' of the presenter's current screen to be displayed in one of the individual feedback displays 915 such as in FIG. 9. The presenter may then be able to see how many viewers have currently received the visual data corresponding to that particular screen.

Figure 11:
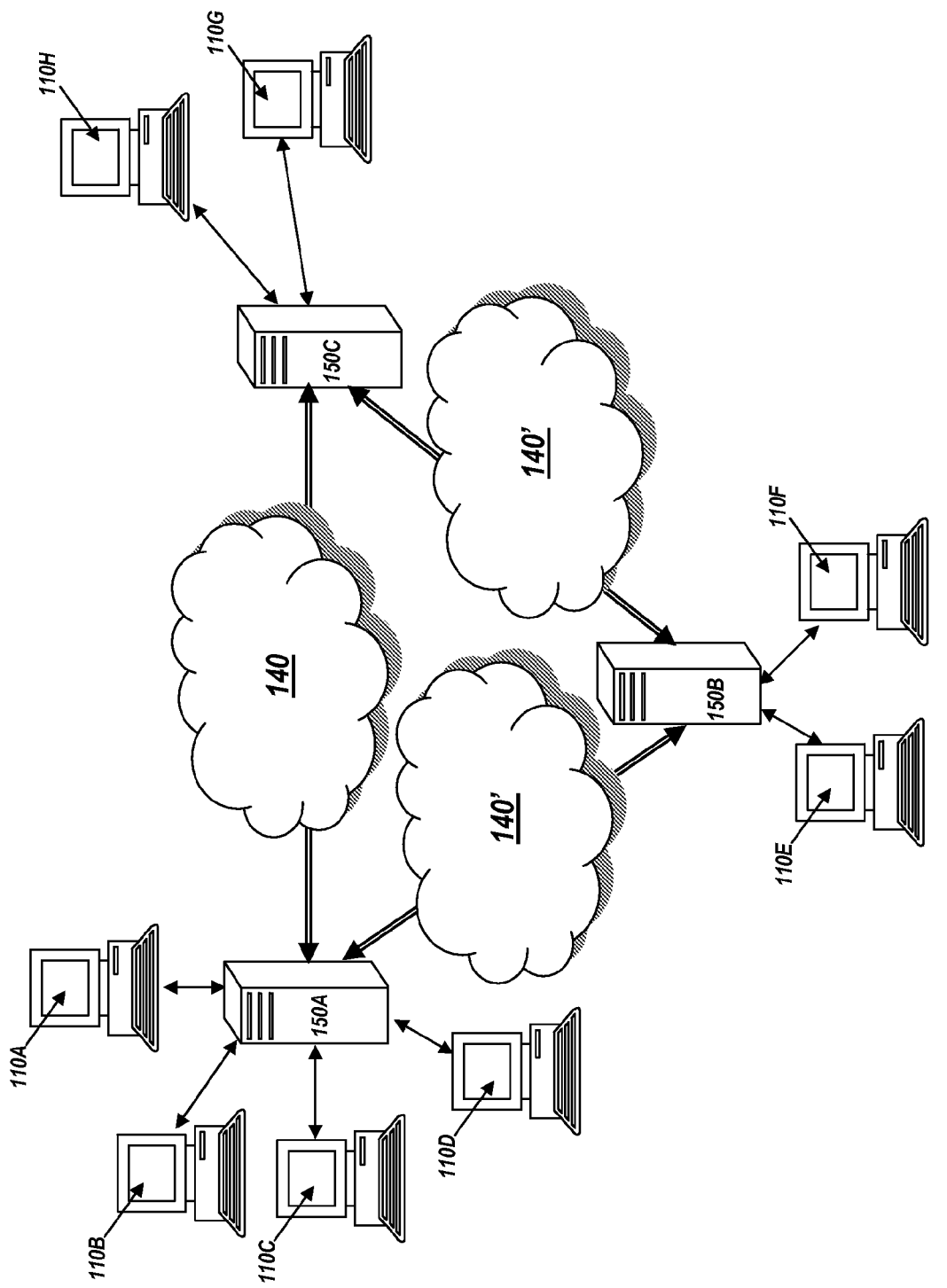
FIG. 11 is a block diagram showing another embodiment of a distributed computing environment.

With reference to FIG. 11, a distributed computing environment 100' having multiple servers 150A, 150B, 150C is shown and described. Although shown as having three servers 150, any number of servers 150 can be used. In such an environment, each server 150 is also a participant because is receives updates to the shared communications channel 400 from the other servers 150. In large on-line collaboration situations (e.g., a webinar having thousands of participants) it is difficult for a single server 150 to manage and service the all the connection requests from the participants. As such, multiple servers 150 are used to balance the load each server 150 must handle.

There are numerous on-line collaboration and presentation products that can operate in the distributed computing environment 100. Exemplary products include, but are not limited to GOTOMEETING and GOTOWEBINAR offered by Citrix Online, LLC of Santa Barbara Calif. Certain aspects and features described above can be embodied in such a product. Other products include WEBEX EMX, WEBEX ENTERPRISE EDITION, WEBEX EVENT CENTER, WEBEX GLOBALWATCH, WEBEX MEETING CENTER, WEBEX MEETMENOW, WEBEX PRESENTATION STUDIO, WEBEX SALES CENTER, WEBEX TRAINING CENTER, WEBEX WEBOFFICE, AND WEBEX WORKSPACE offered by WebEx Communications, Inc. of Santa Clara Calif. Another example is the LIVEMEETING product offered by of Microsoft Corporation of Redmond, Wash. Other products include, but are not limited to, MeetingLinc, LearnLinc, ConferenceLinc, SupportLinc, iLinc On-Demand, and EventPlus offered by iLinc Communications of Phoenix, Ariz.

The previously described embodiments may be implemented as a method, apparatus or article of manufacture using programming and/or engineering techniques to produce software, firmware, hardware, or any combination thereof. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.), a file server providing access to the programs via a network transmission line, wireless transmission media, signals propagating through space, radio waves, infrared signals, etc. The article of manufacture includes hardware logic as well as software or programmable code embedded in a computer readable medium that is executed by a processor. Of course, those skilled in the art will recognize that many modifications may be made to this configuration without departing from the scope of the present invention.

Although the present invention has been described with reference to specific details, it is not intended that such details should be regarded as limitations upon the scope of the invention, except as and to the extent that they are included in the accompanying claims.

What is claimed is:

1. In an on-line presentation environment having a presenter transmitting screen data to one or more viewers, a method of providing to the presenter visual feedback by scaling the number of confirmation receipts of screen change data from the one or more viewers, the method comprising:

analyzing a plurality of screen change data sets at a first computing device of the on-line presentation environment, each screen change data set representing a change to a visual display of the presenter;

tagging, by the first computing device in response to the analysis, a subset of the plurality of screen change data sets as requesting an automatically generated acknowledgement of receipt from the one or more viewers;

transmitting an untagged screen change data set and a tagged screen change data set to the one or more viewers;

receiving an automatically generated confirmation of receipt of the tagged screen change data set from at least one of the one or more viewers following receipt thereat of the tagged screen change data set;

generating a representation of the tagged screen change data set received by the one or more viewers in response to receiving the automatically generated confirmation of receipt; and displaying the generated representation at the presenter.

2. The method of claim 1 wherein the analyzing comprises analyzing the plurality of screen change data sets at a communication server of the on-line presentation environment.

3. The method of claim 1 wherein the analyzing comprises analyzing the plurality of screen change data sets at the presenter of the on-line presentation environment.

4. The method of claim 1 further comprising determining one or more of the one or more viewers to confirm receipt of the tagged screen change data set.

5. The method of claim 4 wherein the determining comprises selecting, by the presenter, one or more of the one or more viewers having an associated bandwidth that exceeds a predetermined level.

6. The method of claim 4 wherein the determining comprises comparing, by each of the one or more viewers, an associated bandwidth with a predetermined bandwidth, and wherein a confirmation of receipt is received from the one or more of the one or more viewers that equal or exceed the predetermined bandwidth.

7. The method of claim 4 wherein the determining comprises selecting by an end-user of the presenter the one or more of the one or more viewers from which to receive a confirmation of receipt of the tagged screen change data set.

8. The method of claim 4 wherein the determining occurs periodically.

9. The method of claim 4 wherein the determining comprises randomly selecting one or more of the one or more viewers to confirm receipt of the tagged screen change data set.

10. A computer readable medium having executable instructions thereon to provide a presenter of an on-line presentation environment visual feedback regarding the status of one or more viewers by scaling the number of confirmation receipts of screen change data from the one or more viewers, the computer readable medium comprising:

instructions to analyze a plurality of screen change data sets at a first computing device of the on-line presentation environment, each screen change data set representing a change to a visual display of the presenter;

instructions to tag, by the first computing device in response to the analysis, a subset of the plurality of screen change data sets as requesting an automatically generated acknowledgement of receipt from the one or more viewers;

instructions to transmit an untagged screen change data set and a tagged screen change data set to the one or more viewers;

instructions to receive an automatically generated confirmation of receipt of the tagged screen change data set from at least one of the one or more viewers following receipt thereat of the tagged screen change data set;

instructions to generate a representation of the tagged screen change data set received by the one or more viewers in response to receiving the automatically generated confirmation of receipt; and instructions to cause the display of the generated representation at the presenter.

11. The computer readable medium of claim 10 wherein the instructions to analyze comprise instructions to analyze the plurality of screen change data sets at a communication server of the on-line presentation environment.

12. The computer readable medium of claim 10 wherein the instructions analyze comprise instructions to analyze the plurality of screen change data sets at the presenter of the on-line presentation environment.

13. The computer readable medium of claim 10 further comprising instructions to determine one or more of the one or more viewers to confirm receipt of the tagged screen change data set.

14. The computer readable medium of claim 13 wherein the instructions to determine comprise instructions to select, by the presenter, one or more of the one or more viewers having an associated bandwidth that exceeds a predetermined level.

15. The computer readable medium of claim 13 wherein the instructions to determine comprise instructions to compare, by each of the one or more viewers, an associated bandwidth with a predetermined bandwidth, and wherein the instructions to receive comprise instructions to receive a confirmation of receipt from the one or more of the one or more viewers that equal or exceed the predetermined bandwidth.

16. The computer readable medium of claim 13 wherein the instructions to determine comprise instructions to select by an end-user of the presenter the one or more of the one or more viewers from which to receive a confirmation of receipt of the tagged screen change data set.

17. The computer readable medium of claim 13 wherein the instructions to determine execute periodically.

18. The computer readable medium of claim 13 wherein the instructions to determine comprise instructions to randomly select one or more of the one or more viewers to confirm receipt of the tagged screen change data set.

19. A computing device that provides a presenter of an on line presentation environment visual feedback regarding the status of one or more viewers by scaling the number of confirmation receipts of screen change data from the one or more viewers, the computing device comprising:

a processor for executing computer readable instructions; and a memory element that stores computer readable instructions that when executed by the processor cause the computing device to:

analyze a plurality of screen change data sets, each screen change data set representing a change to a visual display of the presenter;

tag, in response to the analysis, a subset of the plurality of screen change data sets as requesting an automatically generated acknowledgement of receipt from the one or more viewers;

transmit an untagged screen change data set and a tagged screen change data set to the one or more viewers;

receive an automatically generated confirmation of receipt of the tagged screen change data set from at least one of the one or more viewers following receipt thereat of the tagged screen change data set;

generate a representation of the tagged screen change data set received by the one or more viewers in response to receiving the automatically generated confirmation of receipt; and cause the display of the generated representation at the presenter.

20. The computing device of claim 19 wherein the computing device is a communication server of the on-line presentation environment.

21. The computing device of claim 19 wherein the computing device is a presenter of the online presentation environment.

22. The computing device of claim 19 wherein the memory elements also stores instructions to determine one or more of the one or more viewers to confirm receipt of the tagged screen change data set.

23. The computing device of claim 22 wherein the instructions to determine execute periodically.

24. The computing device of claim 22 wherein the instructions to determine comprise instructions to randomly select one or more of the one or more viewers to confirm receipt of the tagged screen change data set.

* * * * *

UNITED STATES PATENT AND TRADEMARK OFFICE
CERTIFICATE OF CORRECTION

| | | |
|---|---|---|
| PATENT NO. | : 7,747,953 B2 | Page 1 of 1 |
| APPLICATION NO. | : 11/424396 | |
| DATED | : June 29, 2010 | |
| INVENTOR(S) | : Rafael H. Saavedra | |

It is certified that error appears in the above-identified patent and that said Letters Patent is hereby corrected as shown below:

On the second page of the patent, INID 56, in the "U.S. PATENT DOCUMENTS" insert the following:

-- 6,449,041 B1        9/2002        Jung et al. --

Signed and Sealed this

Fourth Day of January, 2011

David J. Kappos
*Director of the United States Patent and Trademark Office*